(12) United States Patent
Head

(10) Patent No.: US 8,312,608 B2
(45) Date of Patent: Nov. 20, 2012

(54) SYSTEM AND METHOD FOR TOILET UNIT INSTALLATION AND REMOVAL

(76) Inventor: John Head, Rossford, OH (US)

( * ) Notice: Subject to any disclaimer, the term of this patent is extended or adjusted under 35 U.S.C. 154(b) by 968 days.

(21) Appl. No.: 12/361,023

(22) Filed: Jan. 28, 2009

(65) Prior Publication Data

US 2009/0199384 A1 Aug. 13, 2009

Related U.S. Application Data

(60) Provisional application No. 61/027,628, filed on Feb. 11, 2008.

(51) Int. Cl.
*B25B 27/14* (2006.01)
*B60P 1/48* (2006.01)
*B66F 5/02* (2006.01)
*B66F 3/24* (2006.01)
*B66F 7/10* (2006.01)
*B23Q 3/00* (2006.01)
*A47K 17/00* (2006.01)

(52) U.S. Cl. ....... 29/281.4; 29/281.1; 254/8 R; 254/2 R; 254/7 B; 254/2 B; 254/89 H; 254/9 B; 254/9 R; 254/10 B; 269/17; 4/661

(58) Field of Classification Search .................. 29/281.1, 29/281.4; 254/85 R, 2 R, 7 B, 2 B, 89 h, 254/9 B, 9 R, 10 B, DIG. 1; 269/17; 4/661
See application file for complete search history.

(56) References Cited

U.S. PATENT DOCUMENTS

| | | | | |
|---|---|---|---|---|
| 4,797,059 A | * | 1/1989 | Karg et al. | 414/590 |
| 5,660,518 A | * | 8/1997 | Meier | 414/458 |
| 6,416,039 B1 | * | 7/2002 | Pietrusynski | 254/8 B |
| 2007/0266492 A1 | * | 11/2007 | Junca | 4/661 |

* cited by examiner

*Primary Examiner* — Monica Carter
*Assistant Examiner* — Nirvana Deonauth
(74) *Attorney, Agent, or Firm* — Fraser Clemens Martin & Miller LLC; Jacob M. Ward

(57) ABSTRACT

An installation and removal system for a toilet unit is provided. The system includes a base having floor engaging wheels coupled thereto. At least one of the floor engaging wheels is adjustable to maintain the base substantially level relative to the floor. An actuator is disposed on the base. A pair of spaced apart support elements are coupled to the actuator and adapted to engage an underside of the toilet unit. An angle of the support elements relative the base is adjustable. The system includes a retaining system coupled to the spaced apart support elements and adapted to couple with the toilet unit. The retaining system militate against an undesired movement of the toilet unit relative the support elements. A kit and method for using the system are also provided.

13 Claims, 3 Drawing Sheets

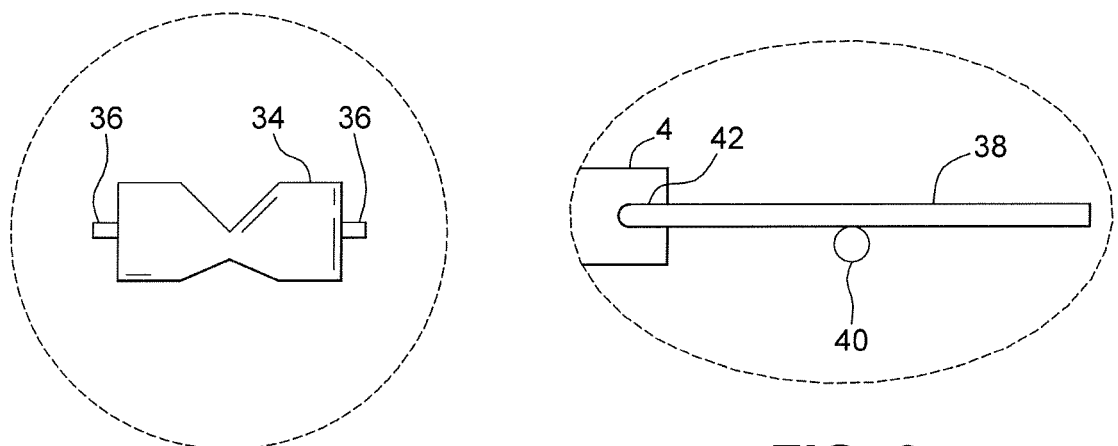
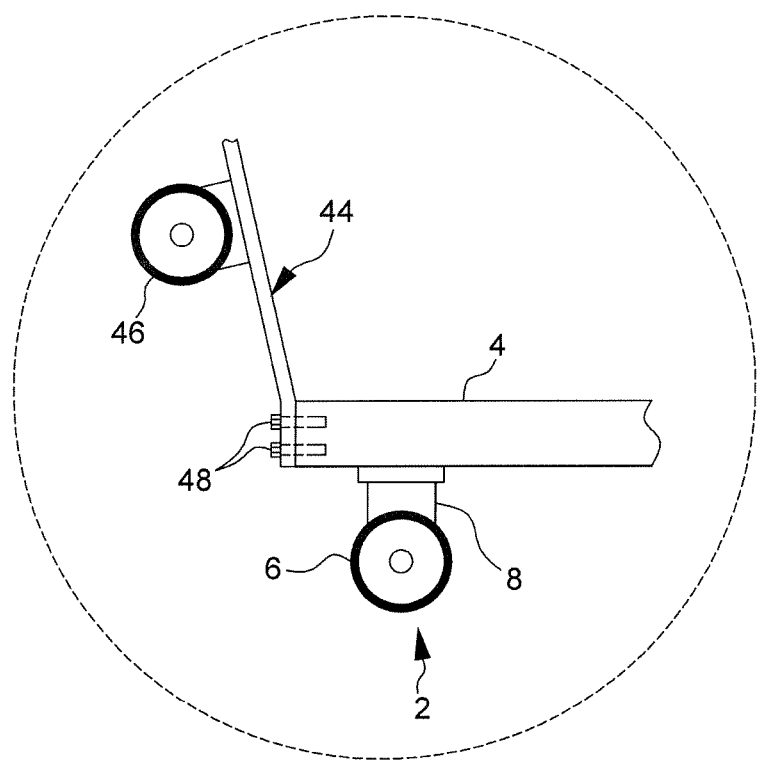

US 8,312,608 B2

SYSTEM AND METHOD FOR TOILET UNIT INSTALLATION AND REMOVAL

CROSS-REFERENCE TO RELATED APPLICATION

This application claims the benefit of U.S. Provisional Application No. 61/027,628, filed on Feb. 11, 2008. The entire disclosure of the above application is hereby incorporated herein by reference.

FIELD OF THE INVENTION

The present disclosure relates to toilet unit installation and removal and, more particularly, to a system and method for installing and removing wall hung toilet units, floor mounted toilet units, and urinals.

BACKGROUND OF THE INVENTION

An installation, transportation, and removal of wall hung and floor mounted toilet units presents a plumber with a variety of problems. The typical toilet unit is large and unwieldy. Maneuvering the toilet unit into and out of toilet stalls is particularly problematic. Transportation of the toilet unit into and out of a building presents difficulties when moving the toilet unit up or down a flight of steps or into an elevator. The conventional ceramic toilet unit is slippery when wet and may be easily damaged if dropped. Wet shards of broken ceramic may readily injure an installer. The breaking of even one toilet unit is costly. Leakage of water during installation and removal of toilet units, particularly on tile floors, also represents a slip hazard for restroom patrons. The manual maneuvering of the typical toilet unit by plumbers during installation or removal may result in painful and costly back injuries.

There is a continuing need for a system and method for safe and efficient installation, transportation, and removal of a toilet unit. Desirably, the system and method facilitate a cleaner installation and removal of the toilet unit and an improved maneuverability in comparison to known systems and methods.

SUMMARY OF THE INVENTION

In concordance with the instant disclosure, a system and method for safe and efficient installation, transportation, and removal of a toilet unit, to facilitate a cleaner installation and removal of the toilet unit and an improved maneuverability, is surprisingly discovered.

In one embodiment, an installation and removal system for a toilet unit includes a base having a plurality of floor engaging wheels. At least one of the floor engaging wheels is adjustable to maintain the base substantially level relative to the floor. A handle is pivotally coupled to the base. An actuator is disposed on the base. A pair of spaced apart support elements is coupled to the actuator and adapted to engage an underside of the toilet unit. An angle of the support elements relative the base is adjustable. A retaining system is coupled to the spaced apart support elements. The retaining system is adapted to couple with the toilet unit and militate against an undesired movement of the toilet unit relative the support elements.

In another embodiment, a toilet installation and removal kit includes the installation and removal system having at least one tool tray coupled to the base, and a retaining system adapted to couple with the toilet unit and militate against an undesired movement of the toilet unit relative the support elements. A ratchet wrench, a pair of ratchet wrench extensions, a first ratchet wrench socket adapted to cooperate with a mounting fastener, a second ratchet wrench socket adapted to adjust the floor engaging wheels, a screwdriver for turning off a water supply to the toilet unit, a pair of smooth jaw channel locks, and a crescent wrench may be disposed in the tool tray.

A method providing an installation and removal system for a toilet unit, including the steps of: providing a base having a plurality of floor engaging wheels coupled thereto, wherein at least one of the floor engaging wheels is adjustable to maintain the base substantially level relative to the floor, a handle pivotally coupled to the base, an actuator disposed on the base, a pair of spaced apart support elements coupled to the actuator and adapted to engage an underside of the toilet unit, wherein an angle of the support elements relative the base is adjustable, and a retaining system coupled to the spaced apart support elements, the retaining system adapted to couple with the toilet unit and militate against an undesired movement of the toilet unit relative the support elements; engaging an underside of the toilet unit with the pair of spaced apart support elements; and securing the toilet unit to the system with the retaining system. The toilet unit may be one of installed and removed with the installation and removal system as desired.

DRAWINGS

The above, as well as other advantages of the present disclosure, will become readily apparent to those skilled in the art from the following detailed description, particularly when considered in the light of the drawings described hereafter.

FIG. 4 is a side elevational view of the toilet unit support block shown in window of FIG. 3;

FIG. 6 is a side elevational view of the spring plate shown in window of FIG. 5; and FIG. 7 is a fragmentary side elevational view of the system shown in FIG. 1, further showing an insert for converting the system to a two-wheel dolly.

DETAILED DESCRIPTION OF THE INVENTION

Figure 1:
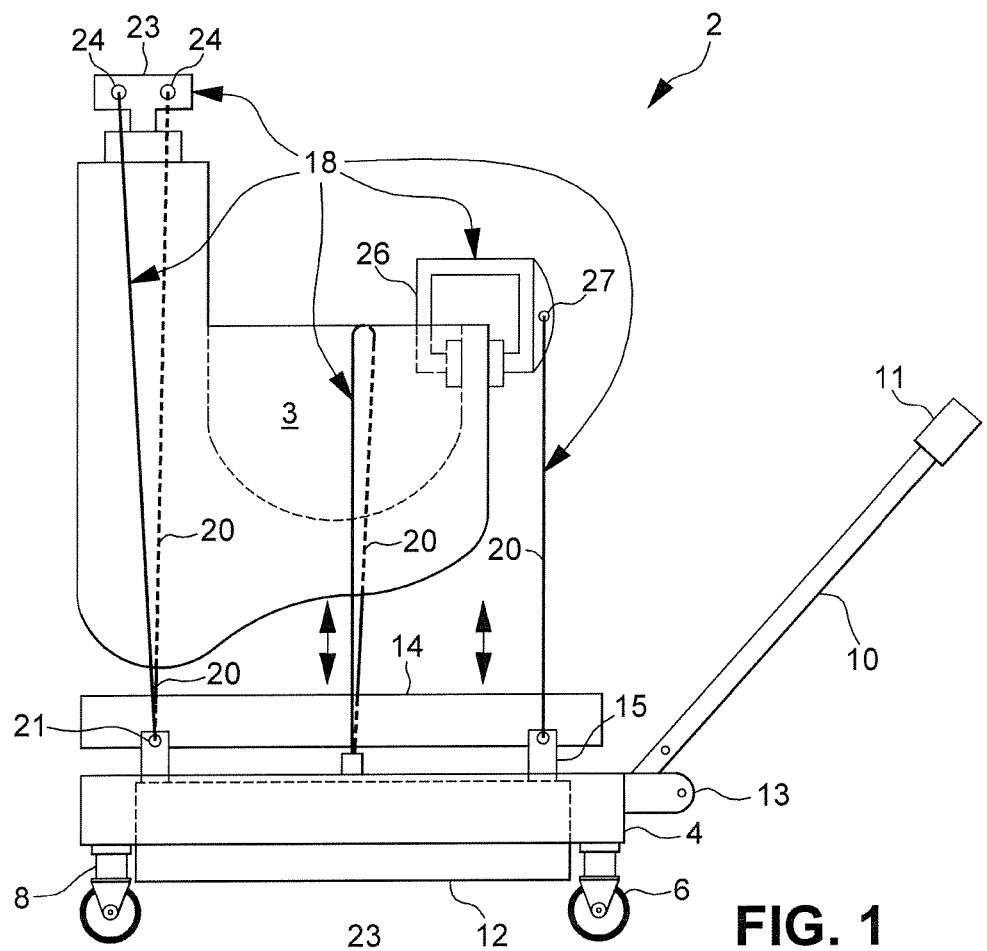
FIG. 1 is a side elevational view of the system according to one embodiment of the present disclosure.
Figure 2:
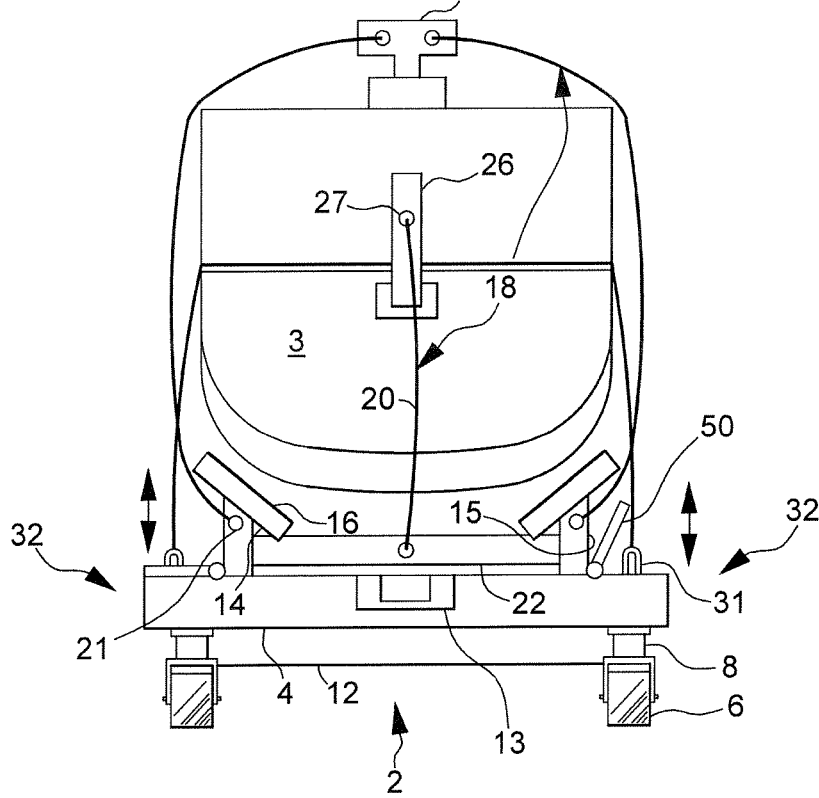
FIG. 2 is a front elevational view of the system shown in FIG. 1, shown without a handle for purpose of illustration.

The following description is merely exemplary in nature and is not intended to limit the present disclosure, application, or uses. It should also be understood that throughout the drawings, corresponding reference numerals indicate like or corresponding parts and features. In respect of the methods disclosed, the steps presented are exemplary in nature, and thus, are not necessary or critical.

As shown in FIGS. 1 to 7, the present disclosure includes an installation and removal system 2 for a toilet unit 3. The toilet unit 3 may be one of a wall mounted toilet unit, a floor mounted toilet unit, and a urinal, for example. The system 2 includes a base 4 having floor engaging wheels 6 coupled thereto. The base 4 may be substantially U-shaped, for example, to facilitate the use of the system 2 with a variety of toilet units 3 such as the wall mounted toilet units and the floor mounted toilet units.

The floor engaging wheels 6 may be formed from substantially non-marking materials, such as a non-marking black rubber compound, for example. The floor engaging wheels 6 may be rotatably disposed on an axle (not shown), for example. Typically, at least one of the floor engaging wheels 6 is adjustable in height to maintain the base 4 substantially level relative to the floor. As an example, the wheels 6 are coupled to adjustable legs 8 that depend from the base 4. In a particular embodiment, a first pair of the engaging wheels 6 is disposed at a front end of the base 4 and are each adjustable in height, and a second pair of the engaging wheels 6 is disposed at a back end of the base 4 and are each rotatably disposed or otherwise configured to swivel. Each of the wheels 6 may be at least one of fixed, pivotable, or adjustable in height, as desired. Other means for leveling the base 4 may also be employed.

A handle 10 is pivotally coupled to the base 4. The handle 10 enables an operator to maneuver the system 2 underneath the toilet unit 3. The handle 10 may be selectively locked into a desired position. For example, the handle 10 may be held by a retainer 13 disposed at an end of the base 4 under the handle 10. The handle 10 may be lowered into the retainer 13 and held in place by a pin that may be disposed through each of the retainer and handle 10. The handle 10 may also be one of foldable and removable to facilitate storage of the system 2. In a particular embodiment, the handle 10 has an end fixture 11 that allows the operator to hold and maneuver the system 2. The end fixture 11 may be substantially D-shaped, for example. It should be appreciated that other designs for the handle 10 may be employed within the scope of the present disclosure.

An actuator 12 is disposed on the base 4. The actuator 12 may be one of a hydraulic actuator, an electric actuator, a pneumatic actuator, and a linear actuator, for example. The actuator 12 is coupled to a pair of spaced apart support elements 14 and is adapted to vertically position the spaced apart support elements 14 as desired to engage an underside of the toilet unit 3. It should be appreciated that the spaced apart support elements 14 are angularly adjustable so that the support elements 14 substantially conform to the underside of the toilet unit 3. Each of the support elements 14 may pivot on an upstanding arm 15, for example, linked to the actuator 12. The support elements 14 may be selectively, vertically movable by the actuator 12. The support elements 14 may also be spring biased, for example, to self adjust and conform to the underside of the toilet unit 3. It should also be understood that the angle of the support elements 14 relative the base 4 may be locked to militate against a change in the angle during a transport of the toilet unit 3 that might otherwise result in damage to the toilet unit 3. The support elements 14 may be locked with a spring loaded locking pin, for example. Other means for locking the support elements 14 against a change in the angle may be employed, as desired.

The actuator 12 may be controlled by a lever (not shown) disposed on the handle 10. In another embodiment, the actuator 12 is controlled by one or more foot activated pedals (not shown) disposed on the base 4. In a particular embodiment, the actuator 12 may be in electrical communication with a control pad (not shown), for example, disposed on the handle 10 and allowing the operator to control the actuator 12. A skilled artisan should understand that other suitable means for controlling the actuator 12 may also be employed.

Each of the support elements 14 may have an engaging surface 16 configured to conform to the underside of the toilet unit 3. The engaging surface 16 is further configured to grip the underside of the toilet unit 3 and militate against a slipping thereof during installation or removal. For example, engaging surfaces 16 of the support elements 14 may be formed from an elastomeric material, such as a rubber, disposed on the support elements 14. The engaging surfaces 16 of the support elements 14 may further have a plurality of grooves, dimples, or like grip-enhancing features formed thereon that facilitate the conforming of the engaging surface 16 to the underside of the toilet unit 3. Other suitable materials for the engaging surfaces 16 of the support elements 14 may also be employed.

The installation and removal system 2 of the present disclosure includes a retaining system 18. The retaining system 18 is adapted to couple with the spaced apart support elements 14. The retaining system 18 is also adapted to couple with the toilet unit 3 and militate against an undesired movement of the toilet unit 3 relative the support elements 14. It should be understood that the retaining system 18 may securely couple the toilet unit 3 with the support elements 14 instead of the base 4 so that a lowering of the support elements 14 will not substantially impact the coupling of the retaining system 18 to the toilet unit 3.

In a particular embodiment, the retaining system 18 includes a plurality of cables 20. The cables 20 are configured to be attached to the support elements 14. As illustratively shown in FIG. 2, for example, the cables 20 may be attached to tabs 21 formed at a foot of the support elements 14. In another embodiment, the cables 20 are attached to a bar 22 disposed between the pair of support elements 14. The cables 20 may be formed from any material having sufficient strength to secure the toilet unit 3. Illustratively, the cables 20 may be provided in the form of ribbons or straps as desired. Suitable cables 20 may include polyester or nylon straps, for example. The cables 20 may have hooks or other suitable adapters attached at the ends thereof. The cables 20 may also be attached to suitable tightening systems, such as ratchets, turnbuckles, and the like, as are known in the art. Other suitable means for attaching the cables 20 to the support elements 14, and for varying the length of the cables 20, may be used as desired.

The retaining system 18 may further include a plug adapter 23 configured to cooperate with an inlet spud of the toilet unit 3. The inlet spud of the toilet unit 3 typically cooperates with a flushometer when the toilet unit 3 is in operation. As a nonlimiting example, the flushometer may be disconnected from the toilet unit 3 and replaced with the plug adapter 23. The plug adapter 23 may have external threads to cooperate with internal threads of the inlet spud. The plug adapter 23 may be substantially T-shaped, for example, and have a pair of apertures 24. The T-shaped portion of the plug adapter 23 may be free swiveling. The apertures 24 may be individually coupled to a pair of the cables 20 which in turn are coupled to the support elements 14.

The retaining system 18 may also include a clamp 26. The clamp 26 is affixed to a front lip portion of the toilet unit 3. The clamp 26 may have rubber pads that militate against damage to the front lip portion of the toilet unit 3 when clamped. The clamp 26 has a another aperture 27 that allows the clamp 26 to be coupled to one of the cables 20, which in turn is coupled to the support elements 14. The toilet unit 3 is thereby confined to the installation and removal system 2 with a secure three-point hold, and may be transported as desired.

Although the retaining system 18 may advantageously be coupled to the support elements 14 to allow movement of the support elements 14 without loosening the cables 20, it should be appreciated that the cables 20 may also be coupled to the base 4, as desired. For example, the retaining system 18 may further include one of the cables 20 disposed over a middle portion of the toilet unit 3 to militate against undesired movement thereof. The cable 20 may be coupled to the base 4 at a latching tab 31 of a tool tray 32, for example, as described further herein. The cable 20 may be coupled to the base 4 at other locations, as desired. A skilled artisan should understand that the coupling of the cable 20 to the base 4 will typically occur when a raising or lowering of the support elements 14 will not further occur, in order to further stabilize the toilet unit 3 for transport, for example.

Figure 3:
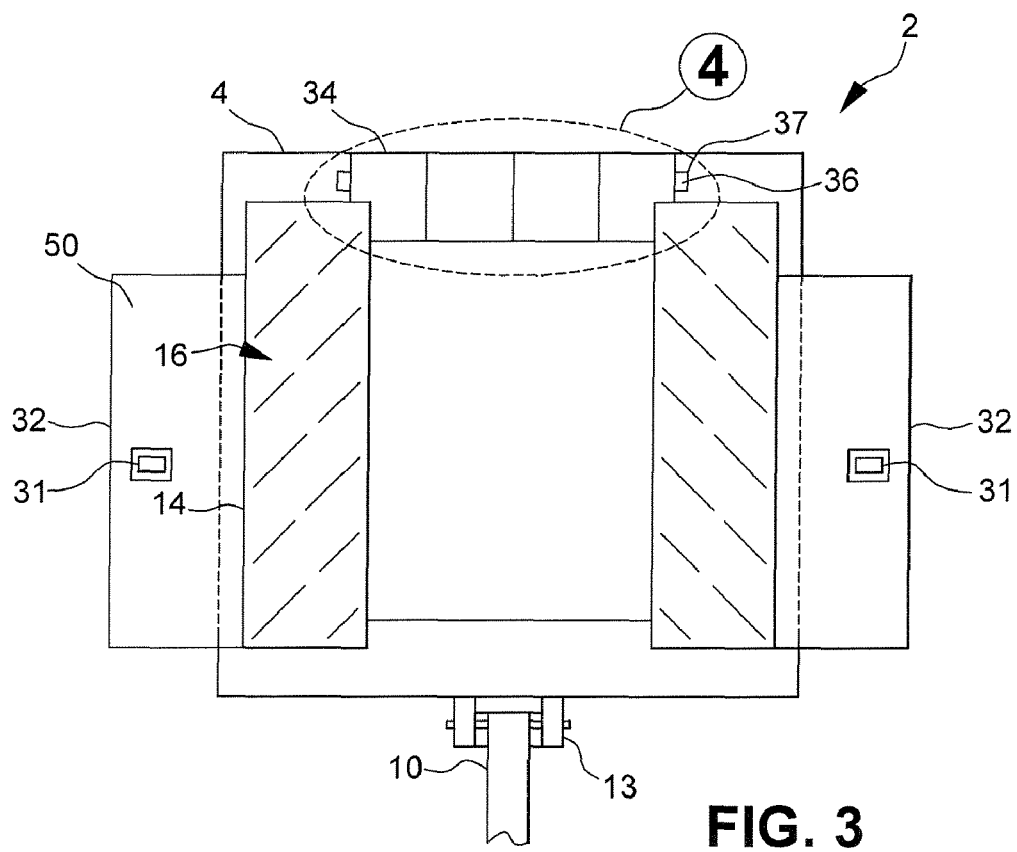
FIG. 3 is a top plan view of the system shown in FIG. 1, showing a toilet unit support block.

As shown in FIGS. 3 and 4, the installation and removal system 2 further includes a support block 34 adapted to one of cushion and support the underside of the toilet unit 3. The support block 34 may be substantially V-shaped, for example. Further, the support block 34 may be formed from a compliant material such as a foam rubber, for example. Other materials may also be employed, as desired.

In certain embodiments, the support block 34 is reversible to conform to a desired underside shape. The support block 34 may be removably coupled to the base 4 with one or more fasteners, for example. In a particular embodiment, the support block 34 includes a pair of support pins 36 that are selectively received in matching grooves 37 formed in the surface of the base 4. The support block 34 may also be removable to facilitate a use of the system 2 with a floor mounted toilet unit 3.

Figure 5:
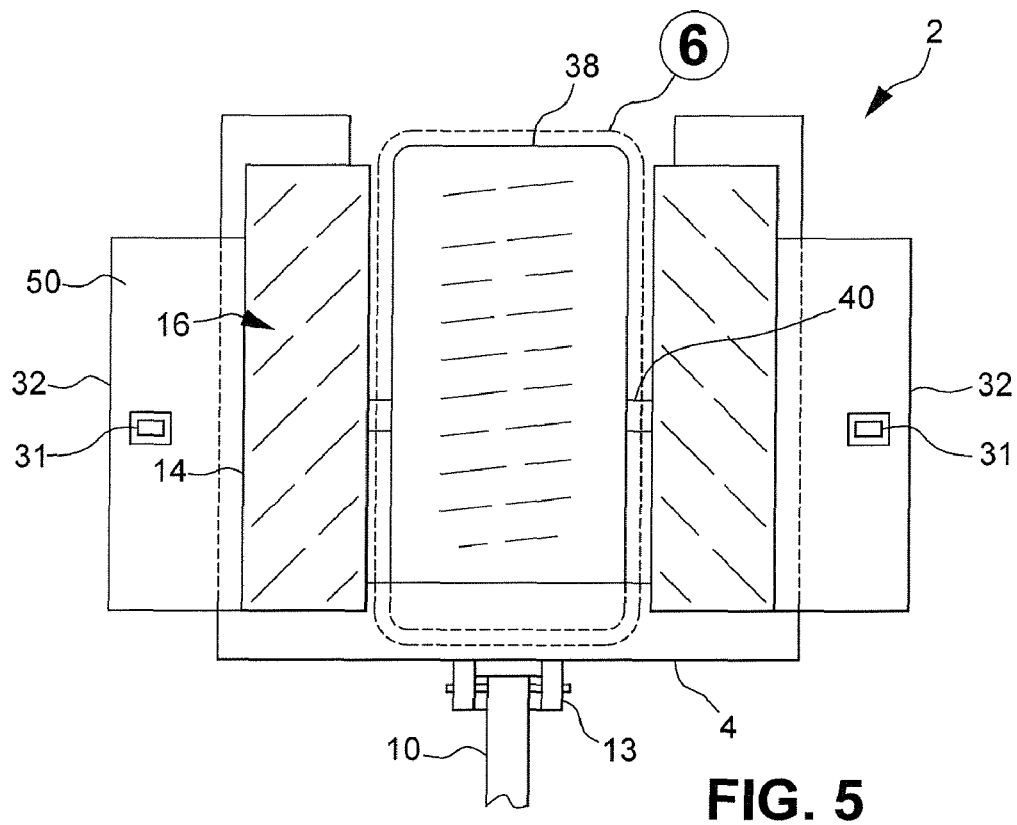
FIG. 5 is a top plan view of the system shown in FIG. 1, showing a spring plate for supporting a toilet unit.

As shown in FIGS. 5 and 6, the installation and removal system 2 may include a spring plate 38 that extends outwardly from the base 4 and above the floor. The spring plate 38 is adapted to support the underside of the toilet unit 3. The spring plate 38 is removably coupled to the base 4 with one or more fasteners, such as threaded fasteners and the like. In a particular embodiment, the spring plate 38 rests atop a balancing bar 40 that extends between the spaced apart portions of the substantially U-shaped base 4. The balancing bar may be a full- or half-pipe disposed substantially midway between the closed and open ends of the U-shaped base 4, for example. An end of the spring plate 38 may be inserted into a spring plate slot 42 formed in the base 4. The end of the spring plate 38 may also be secured by fastening means such as a wing nut and bolt, and the like. The spring plate 38 is readily be inserted into the spring plate slot 42 and rest atop the balancing bar 40 to support the underside of the toilet unit 3. It should be understood that other means for coupling the spring plate 38 to the base 4 may be employed, as desired.

In one embodiment shown in FIG. 7, the installation and removal system 2 may be adapted to include a dolly wheel insert 44 at the end of the base 4 opposite the handle 10. The dolly wheel insert 44 is provided with floor engaging dolly wheels 46 and secured to the base 4. For example, the dolly wheel insert 44 may be inserted into one or more slots formed in the end of the base 4 and secured to the base 4 with threaded fasteners 48, such as set screws. The dolly wheel insert 44 may be disposed substantially perpendicular to the base 4. The dolly wheel insert 44 may also be disposed at other suitable angles relative to the base 4, as desired. The dolly wheel insert 44 is employed to convert the system 2 to a dolly. It should be appreciated that by locking the handle 10 and employing the dolly wheel insert 44, the transportation of the toilet unit 3 down a flight of stairs is facilitated. The two-wheel dolly capability of the system 2 is particularly convenient, for example, when an elevator is not available in a building in which the toilet unit is being installed or removed.

With renewed reference to FIGS. 1 to 3 and 5, the installation and removal system 2 may include the at least one tool tray 32 disposed on at least one side of the base 4. The tool tray 32 is configured to hold the retaining system 18, for example, prior to linking the retaining system 18 to the toilet unit 3. The tool tray 32 may have a lid 50 that is selectively held in place by the latching tab 31, for example, with a lock as is known in the art. The lid 50 is shown in both an open position and a closed position in FIG. 2. Illustratively, the lid 50 may have an aperture formed therein that cooperates with the latching tab 31 to securely hold the lid 50 in the closed position, as desired.

The tool tray 32 may further be adapted to hold one or more desired tools employed during an installation or removal of the toilet unit 3, such as a ratchet wrench, a pair of ratchet wrench extensions (e.g., 18" extensions), a swivel, at least one of a first socket and a second socket (e.g., the first socket for mounting fasteners, and the second socket for adjusting the level of the system 2), a screw driver (e.g., for shutting off a water supply), a pair of smooth jaw channel locks, and a crescent wrench, for example.

The tool tray 32 may further hold desired components employed during an installation or removal of the toilet unit 3, such as the free swiveling T-shaped plug adapter 23 (e.g., to screw to the inlet spud of the toilet unit 3), a nut with a bleeder valve (e.g., to screw to an open end of the flushometer after disconnecting the toilet unit 3 therefrom), and one or more toilet sewage discharge plugs (e.g., 3" or 4" standards). It should be understood that having each of the tools readily available at the system 2 militates against repeat trips to and from one's work vehicle and the toilet unit 3, and increases an efficiency in installation or removal of the toilet unit 3. In particular embodiments, the tools and the system 2 may be provided and sold as a kit. Other suitable tools may also be disposed in the tool tray 32.

The present disclosure further includes a method for moving the toilet unit 3, for example, by one of installing and removing the toilet unit 3. The method includes the steps of: providing the installation and removal system 2 for the toilet unit 3 as described hereinabove; engaging the underside of the toilet unit 3 with the pair of spaced apart support elements 14; and securing the toilet unit 3 to the system 2 with the retaining system 18. The toilet unit 3 may thereby be installed or removed with the installation and removal system 2, as desired.

Where removal of the toilet unit 3 is desired, the method for removing the toilet unit 3 includes the steps of providing the installation and removal system 2 and the toilet unit 3 connected to a flushometer (e.g., a toilet valve that automatically shuts off after metering out a certain amount of water flow). A water supply to the toilet unit 3 is then turned off. The method further includes the steps of disconnecting the flushometer on the toilet unit 3 from a spud (e.g., a threaded inlet) on the toilet unit 3; screwing a safety cap having a bleeder valve onto the flushometer, thereby militating against a leakage of water from the flushometer if inadvertently activated; and positioning the system 2 under the toilet unit 3.

The actuator 12 then causes the support elements 14 to engage the underside of the toilet unit 3. The retaining system 18 of the system 2 is connected to the inlet spud and to a front lip of the toilet unit 3. The retaining system 18 is tightened to secure the toilet unit 3 to the system 2. The toilet unit 3 is then unfastened from at least one of the wall and the floor by removing mounting fasteners. The toilet unit 3 may then be rolled to a desired location, for example, to the operator's work vehicle for transport to a disposal facility.

Although the method is described hereinabove in relation to removal of the toilet unit 3, it should be understood that the steps of removing and installing the toilet unit 3 are substantially the same, but substantially reversed in order.

As a nonlimiting example, where installation of the toilet unit 3 is desired, the present method includes the steps of: rolling the toilet unit 3 to a desired location; fastening the toilet unit 3 to at least one of a wall and a floor by attaching mounting fasteners; connecting a flushometer on the toilet unit 3 to a spud on the toilet unit 3; loosening the retaining system 18 to remove the toilet unit 3 from the system 2; removing the system 2 from under the toilet unit 3; and turning a water supply to the toilet unit 3 on. The toilet unit 3 is thereby installed.

One of ordinary skill in the art can readily recognize the benefits of the toilet unit installation and removal system 2 described herein. The system 2 militates against damage to expensive toilet units 3. The system 2 provides the plumber greater maneuverability and control, particularly when working in stalls with minimal working space due to inward swinging doors and side-mounted paper holders. The greater controllability provided by the system 2 minimizes accidents and injuries and allows the plumber to control water leakage to a greater extent than is presently known. Consequently, slip hazards are minimized and accidents and injuries related to slippage on wet tiles are militated against. It should also be appreciated that an employment of the system 2 results in less cleanup following the installation and removal of the toilet unit 3.

While certain representative embodiments and details have been shown for purposes of illustrating the invention, it will be apparent to those skilled in the art that various changes may be made without departing from the scope of the disclosure, which is further described in the following appended claims.

What is claimed is:

1. An installation and removal system for a toilet unit, comprising:
    a base having floor engaging wheels coupled thereto, wherein at least one of the floor engaging wheels is adjustable in height to maintain the base substantially level relative to the floor;
    a pair of spaced apart support elements engageable with the toilet unit, wherein an angle of each of the support elements relative the base is adjustable;
    an actuator disposed on the base and coupled to the support elements, the actuator configured to selectively vertically position the support elements; and
    a spring plate removably coupled to the base and configured to support an underside of the toilet unit.

2. The installation and removal system of claim 1, wherein the base is substantially U-shaped, and wherein the system may be employed with both wall mounted and floor mounted toilet units.

3. The installation and removal system of claim 1, further including at least one tool tray coupled to the base.

4. The installation and removal system of claim 1, further including a handle pivotally coupled to the base, the handle enabling an operator to maneuver the system.

5. The installation and removal system of claim 4, further including a dolly wheel insert selectively coupled to an end of the base opposite the handle.

6. An installation and removal system for a toilet unit, comprising:
    a base having floor engaging wheels coupled thereto, wherein at least one of the floor engaging wheels is adjustable in height to maintain the base substantially level relative to the floor;
    a pair of spaced apart support elements engageable with the toilet unit, wherein an angle of each of the support elements relative the base is adjustable;
    an actuator disposed on the base and coupled to the support elements, the actuator configured to selectively vertically position the support elements; and
    a retaining system configured to couple with the toilet unit and militate against an undesired movement of the toilet unit relative the support elements, wherein the retaining system includes a plurality of cables configured to be attached to at least one of the support elements and the base, and wherein the retaining system includes a plug adapter configured to cooperate with an inlet spud of the toilet unit, and a clamp configured to be affixed to a front lip portion of the toilet unit, the plug adapter and the clamp cooperating with the cables to militate against the undesired movement of the toilet unit.

7. The installation and removal system of claim 1, wherein the spaced apart support elements have elastomeric engaging surfaces.

8. An installation and removal system for a toilet unit, comprising:
    a base having floor engaging wheels coupled thereto, wherein at least one of the floor engaging wheels is adjustable in height to maintain the base substantially level relative to the floor;
    a pair of spaced apart support elements engageable with the toilet unit, wherein an angle of each of the support elements relative the base is adjustable;
    an actuator disposed on the base and coupled to the support elements, the actuator configured to selectively vertically position the support elements; and
    a support block removably coupled to the base and including a compliant material configured to cushion and support an underside of the toilet unit.

9. The installation and removal system of claim 8, wherein the support block is reversible to conform to differently shaped toilet unit undersides.

10. The installation and removal system of claim 8, wherein the support block includes a pair of pins configured to be received by grooves formed in a surface of the base, wherein the support block is coupled to the base when the pins are received by the grooves.

11. The installation and removal system of claim 1, wherein the spring plate is disposed in a slot formed in the base and rests atop a balancing bar coupled to the base.

12. A toilet installation and removal kit, comprising:
    an installation and removal system including, a base having ground engaging wheels coupled thereto, wherein the floor engaging wheels are adjustable to maintain the base substantially level relative to the floor, a handle pivotally coupled to the base, an actuator disposed on the base, a pair of support elements coupled to the actuator and configured to engage an underside of the toilet unit, wherein an angle of each of the support elements relative the base is adjustable, and at least one tool tray coupled to the base;
    a retaining system adapted to couple with the toilet unit and militate against an undesired movement of the toilet unit relative the support elements; and
    at least one tool employed during an installation or removal of the toilet unit disposed in the tool tray, wherein the at least one tool includes one of a ratchet wrench, a pair of ratchet wrench extensions, a swivel, at least one of a first socket for mounting fasteners, and a second socket for adjusting the level of the system, a screw driver, a pair of smooth jaw channel locks, and a crescent wrench.

13. A toilet installation and removal kit, comprising:

an installation and removal system including, a base having ground engaging wheels coupled thereto, wherein the floor engaging wheels are adjustable to maintain the base substantially level relative to the floor, a handle pivotally coupled to the base, an actuator disposed on the base, a pair of support elements coupled to the actuator and configured to engage an underside of the toilet unit, wherein an angle of each of the support elements relative the base is adjustable and at least one tool tray coupled to the base a retaining system adapted to couple with the toilet unit and militate against an undesired movement of the toilet unit relative the support elements; and at least one desired component employed during an installation or removal of the toilet unit disposed in the tool tray, wherein the desired component includes at least one of a free swiveling T-shaped plug adapter, a nut with a bleeder valve, and at least one toilet sewage discharge plug.

* * * * *